United States Patent
Matturi et al.

(10) Patent No.: US 6,574,208 B1
(45) Date of Patent: Jun. 3, 2003

(54) METHOD OF ESTABLISHING CONNECTION BETWEEN NETWORK ELEMENTS IN A RADIO SYSTEM

(75) Inventors: Juha Matturi, Kempele (FI); Jukka Pietilä, Helsinki (FI); Derek Sellin, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/445,813

(22) Filed: Dec. 14, 1999

(30) Foreign Application Priority Data

Apr. 29, 1998 (FI) .................................................. 980951

(51) Int. Cl.[7] .......................... H04L 12/28; H04Q 7/24; H04B 1/38; H04M 1/00; G06F 15/177
(52) U.S. Cl. ....................... 370/338; 370/340; 370/255; 455/560; 455/561; 455/446; 709/222
(58) Field of Search ................................ 455/422, 423, 455/424, 560, 561, 446, 419; 370/254, 255, 328, 329, 338, 340, 345; 709/220, 221, 222, 223

(56) References Cited

U.S. PATENT DOCUMENTS

| | | | | |
|---|---|---|---|---|
| 5,974,322 A | * | 10/1999 | Carlsson et al. | 455/446 |
| 6,041,228 A | * | 3/2000 | Niska et al. | 455/419 |
| 6,058,314 A | * | 5/2000 | Seok et al. | 455/507 |
| 6,138,037 A | * | 10/2000 | Jaamies | 455/560 |

FOREIGN PATENT DOCUMENTS

| | | |
|---|---|---|
| WO | 95/01015 A1 | 1/1995 |
| WO | 96/14720 A1 | 5/1996 |
| WO | 99/22541 A1 | 5/1999 |
| WO | 99/35800 A2 | 7/1999 |

\* cited by examiner

*Primary Examiner*—Nay Maung
*Assistant Examiner*—Raymond Persino
(74) *Attorney, Agent, or Firm*—Pillsbury Winthrop LLP

(57) ABSTRACT

A radio system and a method of establishing a connection between network elements in a radio system comprising as network elements one or more base stations, a base station controller and a network management system that are operatively interconnected by means of telecommunication connections. Information between the network elements is transmitted in frames that are divided into time slots. The base station controller controls one or more base stations. Network element identification information has been fed into a network element to be installed, and the network element is physically connected to the system by means of the telecommunication connections. To enable network elements to be quickly and reliably installed, identification information on base stations allowed to be connected to the base station controller is predetermined thereto, and if the base station controller detects that it has been provided with identification information on base stations not yet connected thereto, the base station controller transmits a communication channel at least in some of the frames the base station controller uses for communication with the network elements. After being physically installed, the network element to be installed searches the frames received by means of the telecommunication connections for the communication control channels transmitted by the base station controller, and establishes a connection to the base station controller by means of the communication channels found.

18 Claims, 8 Drawing Sheets

METHOD OF ESTABLISHING CONNECTION BETWEEN NETWORK ELEMENTS IN A RADIO SYSTEM

FIELD OF THE INVENTION

The invention relates to a radio system and a method of establishing a connection between network elements in a radio system comprising as network elements one or more base stations, a base station controller and a network management system that are operatively interconnected by means of telecommunication connections.

BACKGROUND OF THE INVENTION

Modern radio networks are highly complicated systems comprising several different network components, such as base stations, base station controllers, mobile services switching centres, different transmission networks and cross-connection devices. When networks extend or capacity need increases, to build radio networks and to extend existing networks is a demanding and complex procedure that requires a great deal of planning, time and work. FIG. 1 illustrates an example of a radio system comprising a base station controller 100, cross-connection equipment 102, three base stations 104 to 108 and a network management unit 110. The base station 100 is connected by telecommunication connections 112 to the cross-connection equipment 102 to which, in turn, the base station 104 is directly connected, and to which the base stations 106 to 108 are coupled in series such that information supplied from the base station controller to the base station 108 is transmitted via the base station 106. By means of existing methods, each element is to be manually configured in situ one node at a time according to precalculated parameters and schemes. The management connection has thus to be established manually.

Typically, in digital systems information between the network elements is transmitted in frames comprising a plurality of time slots. For example in the digital GSM system a connection between a base station and a base station controller is called Abis interface. Typically, the connection is of a frame form and comprises 32 time slots transmitting traffic at a 64 kbit/s transmission rate, the total capacity thus being 2 Mbit/s. FIG. 2 illustrates an Abis interface. Each connection between a base station and a base station controller takes up some time slots from said frame. The number of time slots per a base station varies depending on the size of the base station and the traffic channel capacity.

When network elements, either cross-connection equipment or base stations, are to be added to an existing system, for example similar to the system according to FIG. 1, known remote control methods are no longer feasible. When the equipment is physically installed and connected either to an existing or built telecommunication connection with the system, the telecommunication connections between a base station and a base station controller must in detail be designed and configured at gate, time slot and partial time slot levels. As far as a network element to be installed is concerned, settings must be fixed by installation personnel in order to enable a management connection to the base station controller to be established, whereupon settings for a new base station can also be fixed from the management unit either manually or by software. Hence, to add a new element is a time-consuming and demanding procedure also susceptible to errors. In order to test a new base station and telecommunication connections allocated thereto, the base station installation personnel must communicate with the network management personnel. This requires detailed task coordination between the management unit personnel and the installation personnel so as to avoid unnecessary waiting times.

BRIEF DESCRIPTION OF THE INVENTION

An object of the invention is thus to provide a method and a system implementing the method so as to enable the above-mentioned problems to be solved. This is achieved by a method of establishing a connection between network elements in a radio system comprising as network elements one or more base stations, a base station controller and a network management system that are operatively interconnected by means of telecommunication connections comprising traffic channels and control channels, and in which system information between the network elements is transmitted in frames that are divided into time slots, and in which system the base station controller controls one or more base stations, and network element identification information has been fed into the network element to be installed, and in which method the network element is physically connected to the system by means of the telecommunication connections.

The method of the invention is characterized by predetermining identification information on base stations allowed to be connected to the base station controller for the base station controller, and the base station controller transmitting a communication channel at least in some of the frames the base station controller uses for communication with the network elements if the base station controller detects that it has been provided with identification information on base stations not yet connected to the base station controller, and after being physically installed, the network element to be installed searching the frames received by means of the telecommunication connections for communication control channels, and establishing a connection to the base station controller by means of the communication channels found.

The invention further relates to a radio system comprising one or more network elements, a base station controller and a network management system that are operatively interconnected by means of telecommunication connections comprising traffic channels and control channels, and in which system information between the network elements is transmitted in frames that are divided into time slots, and in which system the base station controller controls one or more network elements that comprise network element identification information.

The system of the invention is characterized by the base station controller being arranged to update the identification information on base stations allowed to be connected to the base station, and the base station controller being arranged to detect that that it has been provided with identification information on base stations not yet connected to the base station controller, and the base station controller being arranged to transmit a communication channel at least in some of the frames the base station controller uses for communication with the network elements, and the network element to be installed, after being physically installed, being arranged to search the frames received by means of the telecommunication connections for communication control channels, and to establish a connection to the base station controller by means of the communication channels found.

The preferred embodiments of the invention are disclosed in the dependent claims.

The invention is based on the idea that a base station controller controls and monitors the network element installation. Necessary telecommunication capacity is automatically allocated for the use of the network elements without manual couplings or adjustments. A network element to be installed and the base station controller communicate with each other by means of a communication control channel, and the necessary telecommunication capacity for the use of the network element is allocated from a group formed by free channels. Preferably, the aim is to minimize the proportion of separate time slots remaining in the group, in other words the aim is to obtain unbroken groups.

The method and system of the invention provide several advantages. Network element installation into a system is automatized. The amount of necessary manual work decreases significantly. Furthermore, time slot design of telecommunication connections between base station controllers and network elements becomes redundant since connections are automatically established, controlled by the base station controller. Automation enables potential errors, and, consequently, costs to be reduced. Further, the invention enables faster installations since installation personnel must no longer be simultaneously present in network control or in connection with base station controllers. Automation shortens installation time.

Network element installation requires no special and expensive training since automation also reduces the amount of necessary work on the installation site. After identification information on the network elements to be connected has been fed to the base station controller, it starts transmitting a communication control channel for establishing network element connections. When, after the physical installation, a network element is switched on, the network element initiates automatic installation by searching the frames received by means of telecommunication connections for communication control channels of the groups. After the connections and the appropriate base station controller are found, and the necessary channels having automatically been allocated for the use of the network element, the system can automatically test the connections and inform the installer that the connections are working, in other words that the network element is ready for the operational state.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

The invention will be described in the following mainly using a GSM type cellular radio system as an example without, however, being restricted thereto in any way. It will be obvious to those skilled in the art that the solution of the invention can be applied to any digital data transmission system wherein data transmission connections between the network elements are implemented using a time-divisional frame structure, the system comprising the elements disclosed in the preambles of the independent claims.

Figure 1:
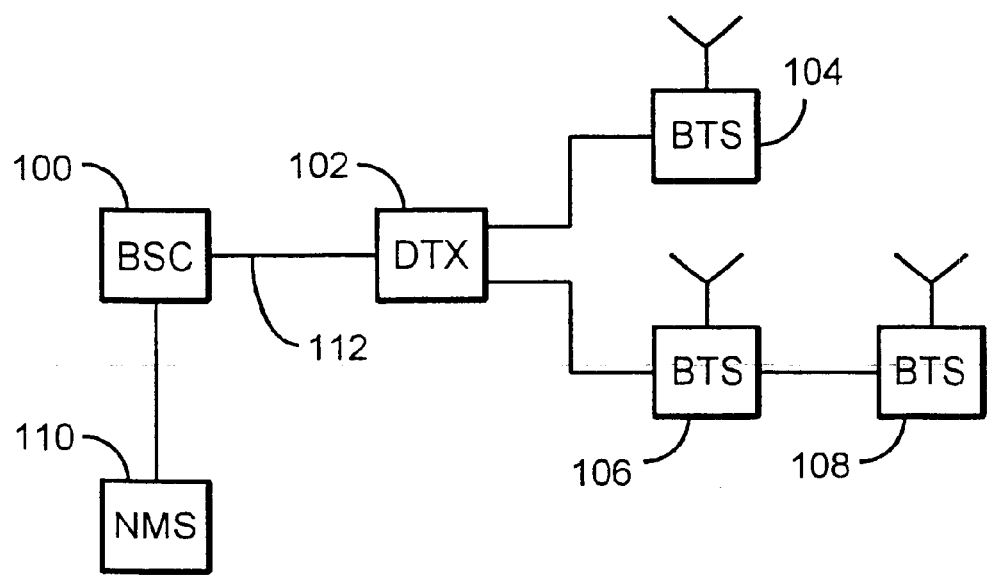
FIG. 1 illustrates an example of a radio system.
Figure 2:
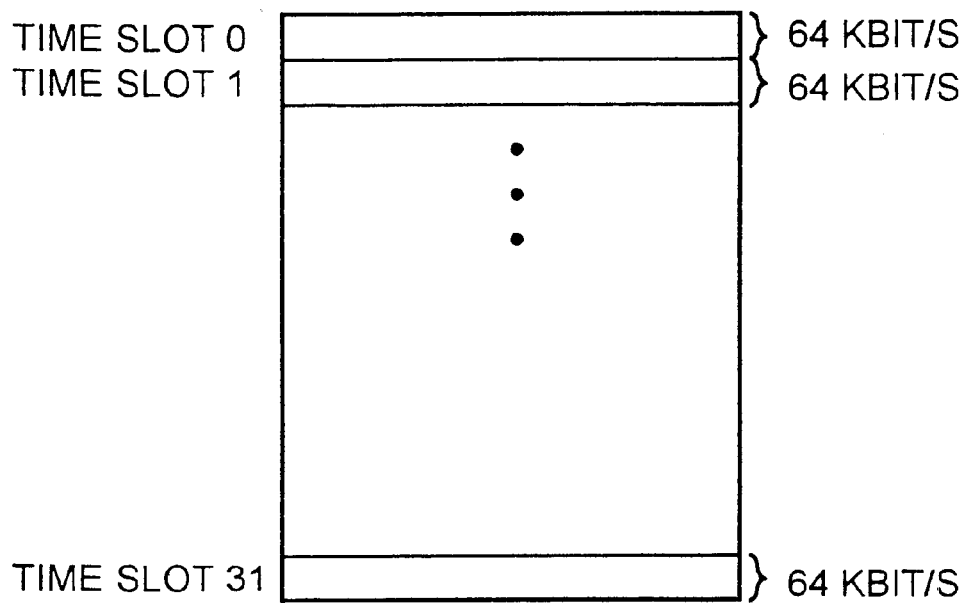
FIG. 2 illustrates an Abis interface.
Figure 3:
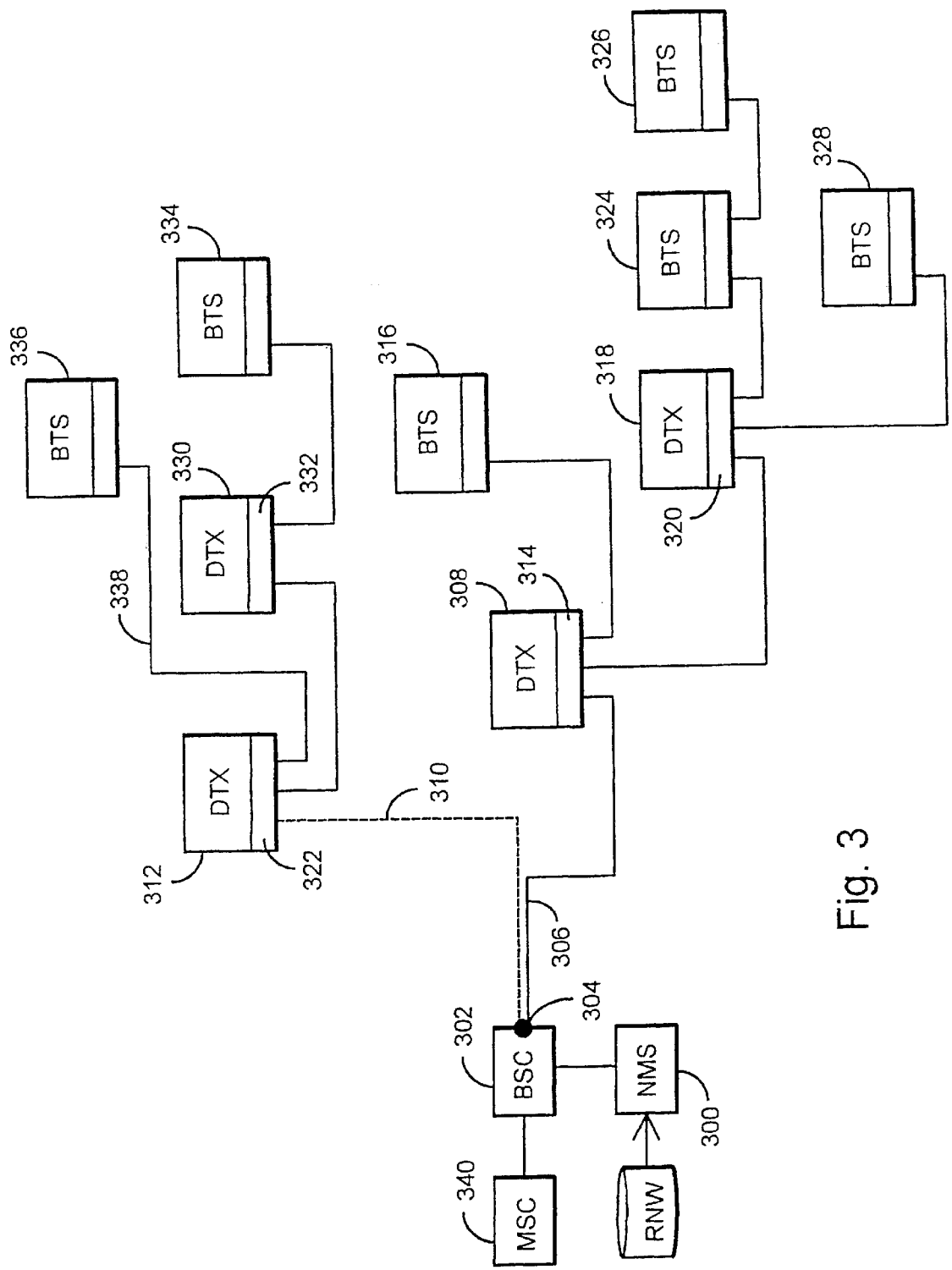
FIG. 3 shows an example of the radio system.

FIG. 3 illustrates an example of a radio system comprising a network management system 300 to enable the operation and operating parameters of the network to be controlled and monitored. The system further comprises a base station controller 302 controlling the operation of base stations located in its area. By means of a gate 314 and a first telecommunication connection 306, first cross-connection equipment 308 is connected to an output gate 304 of the base station controller, and second cross-connection equipment 312 is connected to the output gate 304 of the base station controller by means of a gate 322 and a second telecommunication connection 310. A base station 316 and third cross-connection equipment 318 are connected to the telecommunications gate 314 of the first cross-connection equipment by means of a gate 320. A base station 324 is connected to the gate 320 of the third cross-connection equipment 318, and a base station 326 is coupled in series with the base station 324. A base station 328 is also connected to the gate 320 of the third cross-connection equipment 318. Fourth cross-connection equipment 330 and a base station 336 are connected to the gate 322 of the second cross-connection equipment 312 by means of a gate 332. A base station 334, in turn, is connected to the fourth cross-connection equipment gate 332. The system further comprises a mobile services switching centre 340 controlling the operation of the network and transmitting calls to the other parts of the network and to other telecommunication networks, such as a public network. Telecommunication connections between the system devices, such as the connections 306, 310 or 338, can be implemented in ways known to those skilled in the art, for example by means of cabling or micro wave radios.

Figure 5:
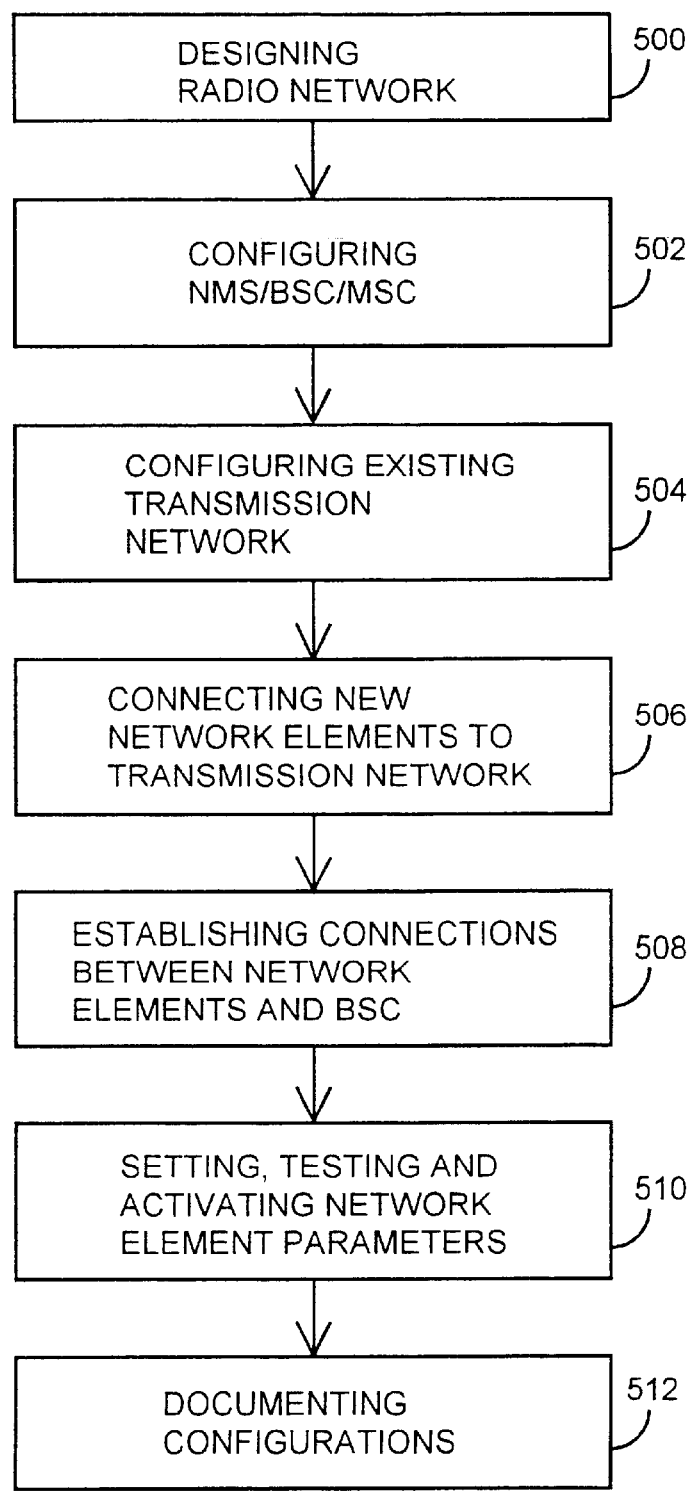
FIG. 5 is a flow diagram illustrating necessary procedures for building and extending the radio system.

By means of a flow diagram shown in FIG. 5, examine next necessary procedures for building or extending the radio system. In the solution of the invention, most network element installation procedures are automated, but, of course, all procedures cannot be automated. The disposition and radio channel design of the radio system's base stations 316, 324, 326, 328, 336 and 334 must be performed in advance using the required radio network designing tools. This is executed in step 500 of FIG. 5. In this step, base station locations and each base station's identification information identifying each base station controlled by the base station are determined. Subsequently, it is to be determined how much transmission capacity each base station needs over the telecommunication connections 306, 310 between the base station and the base station controller 302.

Next, the radio system is configured in step 502. The radio system scheme 316 is fed into the network management system 300, which creates network objects for the base station controller, i.e. determines the network elements. At the same time, transmission groups are created; in frames that are used for communication with the network elements by the base station controller, unused consecutive time slots of the frames are divided into one or more groups. These groups can be called transmission groups. Concurrently, the mobile services switching centre 340 can be configured for new network elements.

In the solution of the invention, the base station controller automatically creates one time slot for each group to be used as a communication channel as regards time slot allocation from said group. In this step, free time slots are not allocated for the use of any particular network element.

Identification information on base stations that can be connected to the base station controller is thus predetermined for the base station controller. When the base station controller detects that it has been provided with identification information on base stations not yet connected to the base station controller, the base station controller transmits a communication control channel at least in some of the frames the base station controller uses for communication with the network elements.

Preferably, LAPD link protocol is used on telecommunication connections between the base station controller and the network elements. The base station controller continually transmits over the communication control channel a link protocol link establishment request message, i.e. an SABME (Set Asynchronous Balanced Mode Extended) message. The message is transmitted from a higher network element, i.e. from the base station controller to a network element, which, when detecting the message, should acknowledge the message by a UA (Unnumbered Acknowledge) message. This will be described in closer detail below.

Next, the existing transmission network of the radio system is configured in step 504. Unused-time-slot groups are transmitted as whole groups in the frames and forwarded in the network from the output gate 304 of the base station controller to network elements to which the base stations can be connected, i.e. typically to cross-connection equipment. Assume in this example that in the figure, the time slot groups can be transmitted to the equipment 308 (and to the gate 314 thereof) and the equipment 330 (and to the gate 332 thereof). The transmission can be performed by software, for example by means of the network management system, if the transmission line 306 is suited for the transmission, or manually at the cross-connection equipment. Assume in this example that the transmission line 306 and the first cross-connection equipment 308 support the remote setting performed by software.

Assume further that the second cross-connection equipment 312 is not capable of processing time slots as whole groups in the frames. Such a situation occurs for example when the system is old, comprising old equipment lacking necessary logic and data processing capacity. This equipment and the more intelligent cross-connection equipment immediately behind the equipment must then be processed manually. Hence, in the present example, the connection from the base station controller passes to the gate 332 in the cross-connection equipment 330, and the settings are manually fixed at the cross-connection equipment 330.

The groups are transmitted as a whole from one gate to another, but the absolute group disposition in a frame may vary. This is illustrated by way of example in FIG. 4.

Figure 4:
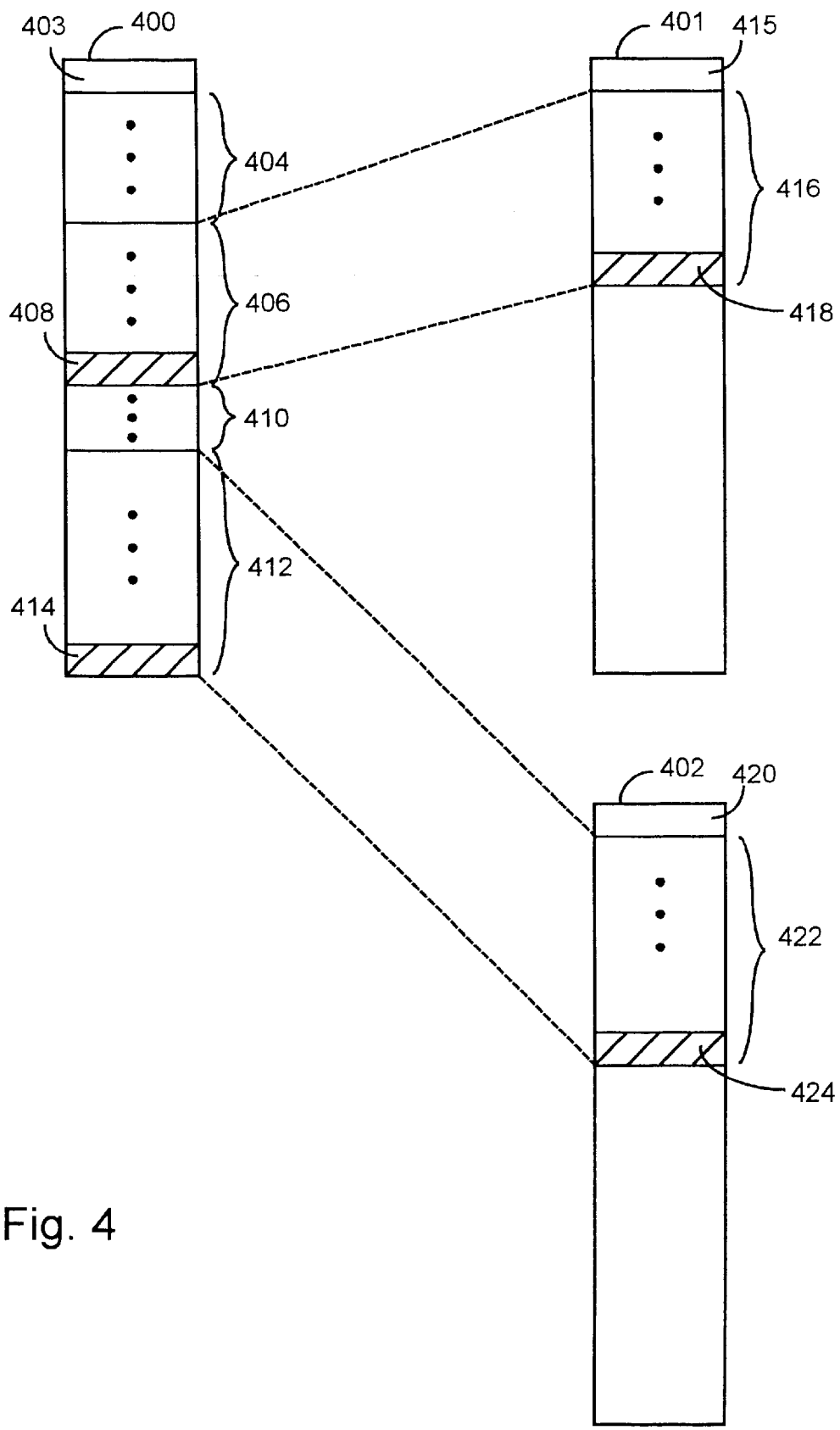
FIG. 4 illustrates an example of an interface between a base station controller and a network element.

FIG. 4 shows a frame 400 in the output gate 304 of the base station controller 304, a frame 401 in the gate 314 of the first cross-connection equipment 308, and a frame 402 in the gate 332 of the fourth cross-connection equipment 330. Each frame thus comprises 32 time slots. The transmission capacity of each time slot is 64 kbit/s. The total transmission capacity of a frame is thus 2 Mbit/s. Assume that a first time slot 403 is used for transmitting link management information. Assume further that next time slots 404 are allocated to another purpose. Next time slots 406 comprise a first group of free time slots. One of the time slots in the group, preferably a last time slot 408, is used as a communication control channel of the group as regards time slot allocation from said group. Next time slots 410 of the frame 400 are, again, allocated for other connections. Next time slots 412 comprise a second group of free time slots. Again, one of the time slots of the group, preferably a last time slot 414, is used as a communication control channel of the group as regards time slot allocation.

The first free-time-slot group 406 is transmitted from the output gate 304 of the base station controller 304 to the gate 314 of the first cross-connection equipment 308. A first time slot 415 of the frame 401 in the gate 314 is used for transmitting link management information. Next time slots 416 comprise the first free-time-slot group. A last time slot 418 of the group serves as the-communication control channel. The time slot disposition of the group in the frame can thus vary in different gates.

The second free-time-slot group 412 is transmitted from the output gate 304 of the base station controller 304 to the gate 332 of the fourth cross-connection equipment 330. A first time slot 420 of the frame 402 in the gate 332 is used for transmitting link management information. Next time slots 422 comprise the first free-time-slot group. A last time slot 424 of the group serves as the communication control channel.

It is to be further noted that the free-time-slot group division shown here is only a simplified example. Naturally, in a real situation there can be several groups in a gate and/or cross-connection equipment and they can be transmitted to cross-connection equipment in ways different from the one described above, for example several groups can be transmitted to the same cross-connection equipment.

Next, new network elements are installed in the radio system and connected to the existing transmission network in step 506. If a base station to be installed in the system is directly connected to cross-connection equipment not supporting time slot processing in groups, as the cross-connection equipment 312 in the example of FIG. 4 to whose gate 322 the base station 336 is connected, the cross-connection equipment gate must be manually activated in order for the base station 336 to receive a 2 Mbit/s frame over the transmission line 338.

In this step, network elements to be installed are physically connected to the system by means of telecommunication connections. If necessary, the required telecommunication connections must be built. In connection with the physical installation, network element identification information is fed into the network element to identify each base station controlled by the base station controller. The identification information could also be fed into the network element earlier, for example at the factory before delivering the network element to the system operator.

Next, connections are established between the new network elements and the base station controller in step 508. In the solution of the invention, connections are established automatically without the network element installer being compelled to perform any other procedures than to switch on the element installed.

In the solution of the invention, a new network element and the base station controller find and identify each other automatically by means of a communication control channel. This is illustrated in FIG. 6 showing a signal sequence chart of a communication control channel implementation.

When the base station controller detects that it has been provided with identification information on base stations not yet connected to the base station controller, the base station controller transmits a communication control channel at least in some of the frames the base station controller uses for communication with the network elements.

Figure 6:
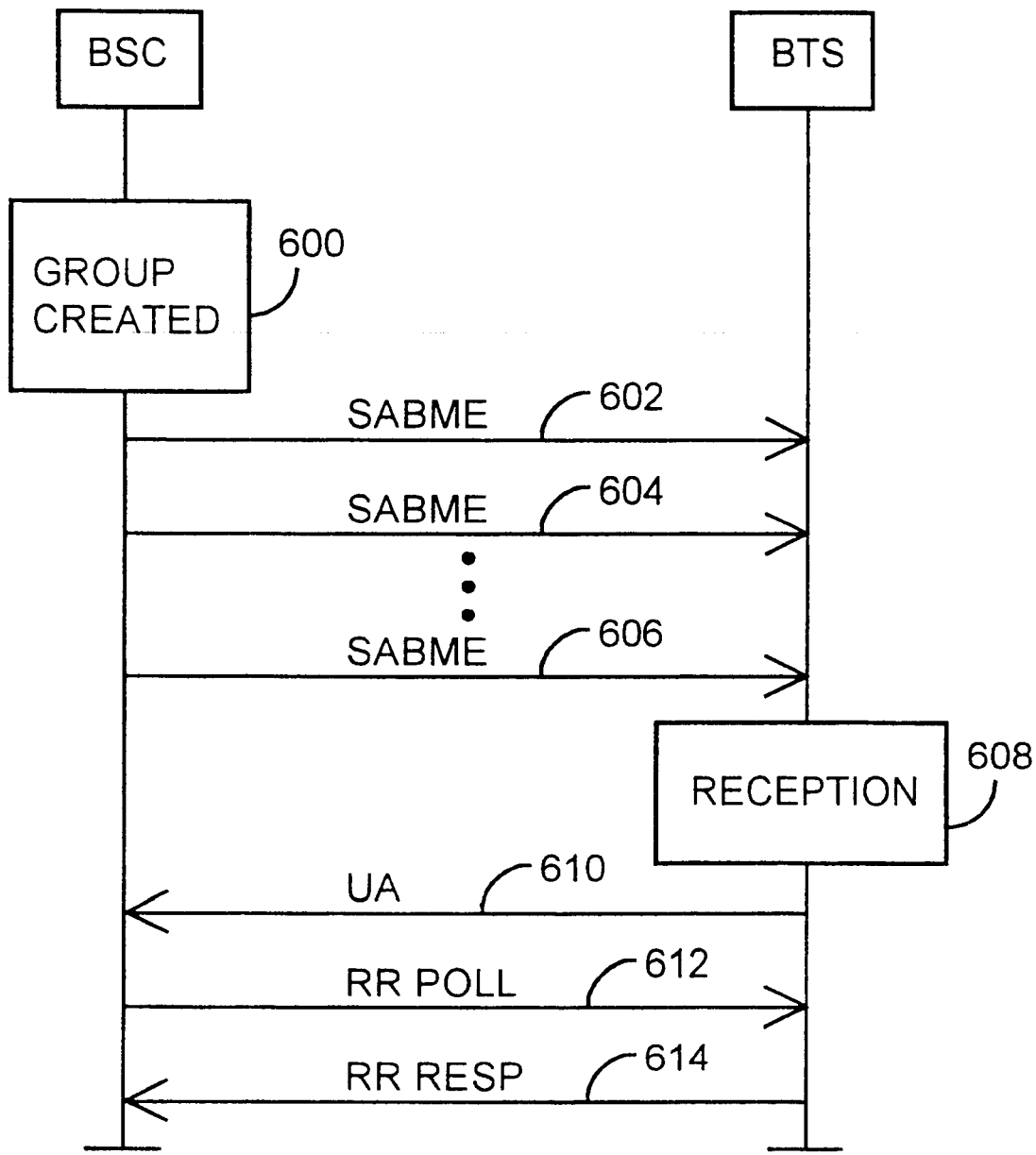
FIG. 6 is a signal sequence chart illustrating a communication control channel.

FIG. 6 illustrates an implementation of signalling between the base station controller and the network element (base station). In step 600, at least one free-time-slot group is created. Preferably, LAPD link protocol is used on telecommunication connections between the base station controller and the network elements. The communication channel is preferably implemented in such a way that the base station controller continually transmits a link protocol link establishment request message, i.e. an SABME (Set Asynchronous Mode Extended) message, on one of the time slots of the group, preferably on the last one. The message is thus transmitted from a higher network element (i.e. from the base station controller to the network element). The message is recurrently 602 to 606 transmitted at the shortest possible intervals. Preferably, the message is transmitted at least at 100 millisecond intervals.

The new base station connected to the system receives the link protocol link establishment request message transmitted by the base station controller in step 608. In the solution of the invention, the base station does not reply to the establishment request message immediately; instead, the base station monitors for a predetermined period of time whether any other base station replies to the same establishment request message. If no other base station replies to the message, the base station transmits an acknowledgement message UA (Unnumbered Acknowledge) 610 to the base station controller. Next, the base station controller confirms the connection by transmitting a receiver ready (RR) message 612 to the base station, which acknowledges the message by a receiver ready response message (RR RESPONSE) 614. The connection between the base station controller and the base station is now set up and the base station to be installed transmits its identification information and hardware information to the base station controller, which compares the identification information with the identification information on the allowed network elements, and when the identification information is allowed, the base station controller accepts the network element. The base station controller allocates necessary time slots from the group for the use of communication between the network element and the base station controller and informs the network element of the allocated time slots over the communication control channel.

If above, when the base station monitors for a predetermined period of time whether any other base station replies to the same establishment request message, another base station replies to the message transmitted by the base station controller, the base station searches for another establishment request message by changing over to another communication control channel. Said predetermined time period can be a unique one according to a base station to be installed.

Figure 7:
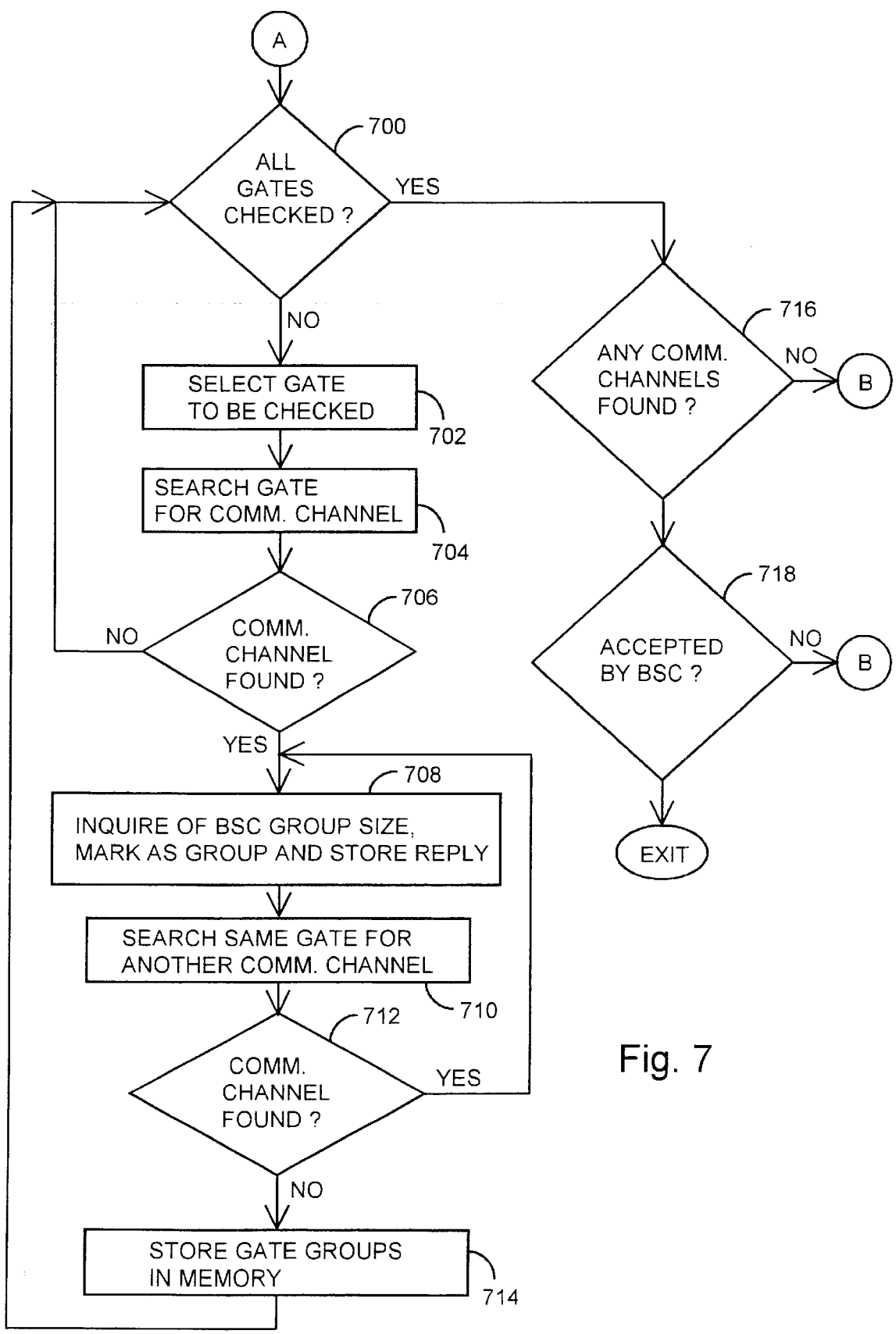
FIG. 7 is a flow diagram illustrating a first example of a search for communication control channels.

Whether a search for communication control channels is performed depends on whether the network element's local gate comprises 2 Mbit/s lines themselves comprising free-time-slot groups. Examine first such a case by means of a flow diagram shown in FIG. 7, illustrated by the base station 336 in the figure.

In step 700, it is tested whether all input gates are checked. If not, a gate to be checked is selected in step 702, and the gate is searched for communication control channels in step 704.

In step 706, a decision is made based on the search. If no communication control channels are found in the gate, the process returns to step 700. If a channel is found, the size of the group defined by the communication control channel is inquired of the base station controller in step 708, the zone is marked as a group and the information is stored in the memory.

Next, the same gate is searched for other communication control channels in step 710.

In step 712, a decision is made on the basis of the search. If a channel is found, the process proceeds to step 708. If no further communication control channels are found in the gate, the groups of the gate are stored in the memory in step 714, and the process returns to step 700.

When all gates are checked, the process proceeds from step 700 to step 716, wherein it is checked whether a communication control channel is found. If no communication control channel is found in the gates, the process exits to algorithm B, which will be described below. If a communication control channel is found, in step 718 it is inquired of the base station controller whether it accepts the network element. This is performed by transmitting the network element identification information to the base station controller. If the base station controller does not accept the network element, a connection is established to the next communication control channel, and further to the next one until each communication control channel is thus checked. Then, the process exits to algorithm B. If the base station controller accepts the network element, the network element configuration is continued controlled by the base station controller. This will be described below.

If no communication control channel or 2 Mbit/s lines themselves comprising free-time-slot groups are found in the network element's local gate, the telecommunication connections must be searched for paths to the network elements having unused-time-slot groups as whole groups in the frames. Such base stations are illustrated by the base stations 324, 326, 328 and 334 in FIG. 3.

In a solution according to a preferred embodiment of the invention, the network elements can thus preferably communicate with each other. This applies to adjacent network elements as well as to chained network elements thus communicating transparently over a network element therebetween. In the solution of the invention, the network elements are capable of automatically, i.e. without manual control, searching the telecommunication connections for paths to other network elements. This can be implemented by means of a special communication connection between the network elements. A communication channel can be allocated between the network elements that use the channel to communicate with each other by means of an agreed-on protocol that can comprise, for example, commands necessary for performing functions shown below in connection with the description of FIG. 8.

A channel can be implemented in many ways. If an overhead channel exists between the network elements, as in radio links (RRI) or high bitrate digital subscriber lines (HDSL), the communication channel can be implemented using this channel. If no such channel exists between the elements, some agreed-on bits in the time slots can be used for this purpose. The disposition of the bits and the time slot used can be dynamically changed when necessary. For example, the two last bits of time slot 31 can be used as a default. If these bits are allocated to traffic, corresponding bits in the previous time slots can be examined until a time slot with unused bits is found. The search can be performed until free space is found.

Figure 8:
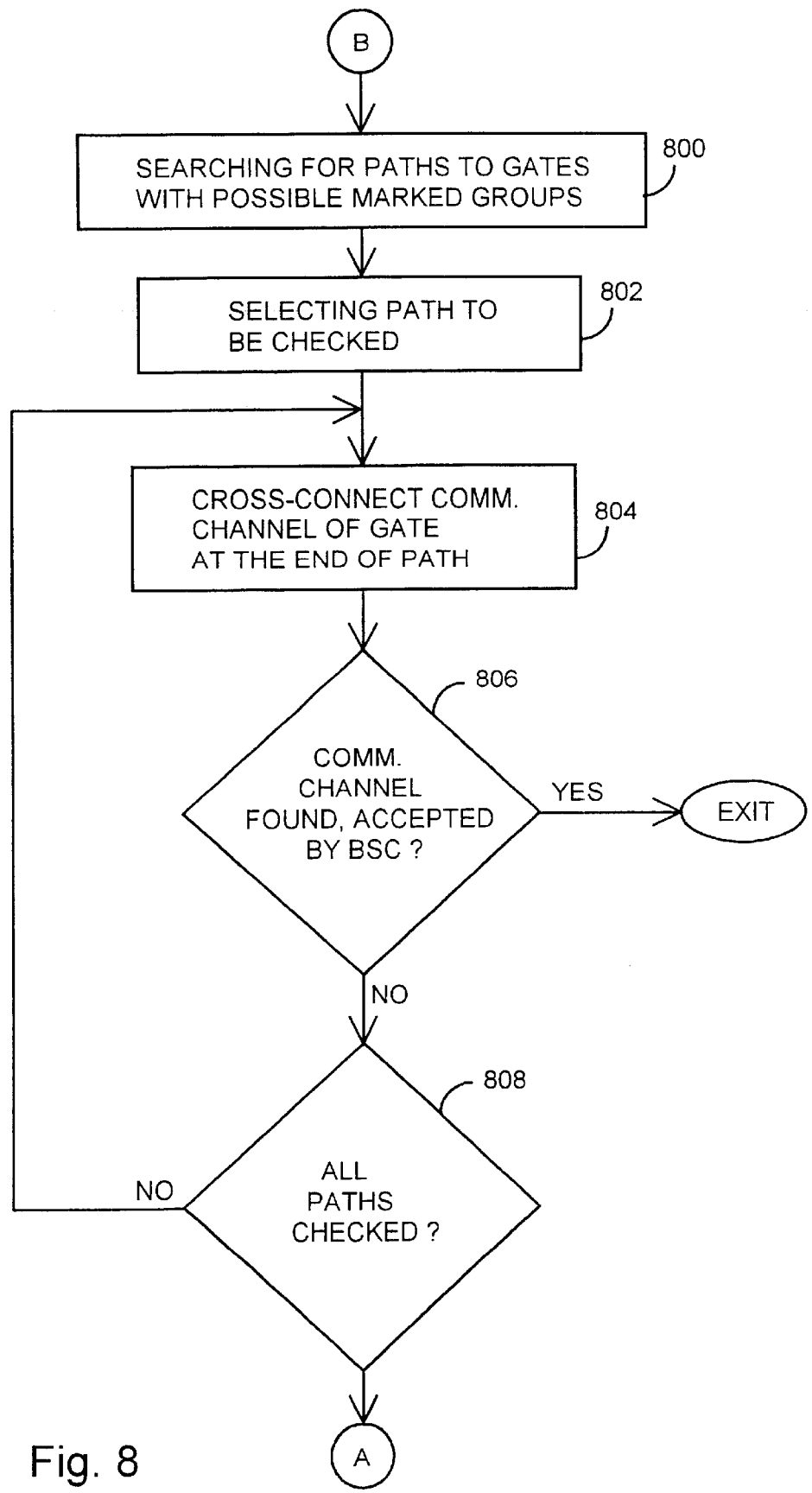
FIG. 8 is a flow diagram illustrating a second example of the search for communication control channels.

Examine next a flow diagram of FIG. 8 illustrating algorithm B, which is executed when no communication control channel or 2 Mbit/s lines themselves comprising free-time-slot groups are found in the network element's local gate. In FIG. 3, such base stations are illustrated by the base stations 324, 326, 328 and 334.

In step 800, the network element searches the telecommunication connections for paths to the network elements which comprise unused-time-slot groups as whole groups in the frames.

In step 802, a path to be checked is selected.

In step 804, it is inquired of a corresponding network element whether a communication control channel exists in a gate located at the end of the path to be checked.

The above-mentioned procedure to test whether the base station controller accepts the network element is performed by transmitting network element identification information and hardware configuration parameters to the base station controller. After receiving the above-mentioned information from the network element, the base station controller is arranged to search its data base for the identification information, and if corresponding identification information is found, the hardware configuration is appropriate, and a necessary number of free time slots is found in the free-time-slot group indicated by the communication control channel, the base station can accept the network element.

If a communication control channel is found and the base station controller using the channel accepts the network element, the process can exit the algorithm, and the network element configuration is continued controlled by the base station controller. This will be described below.

If no communication control channel is found or the base station controller using the channel does not accept the network element, it is checked in step 808 whether all paths are checked; if not, the process proceeds to step 804 to check the next path. If all paths are already checked, the process returns to the beginning of algorithm A to have a recheck, since, obviously, no physical connections existed in the previous check. On the basis of algorithm A first executed and algorithm B executed next and physical connections established later, the base station is capable of performing the search automatically by the two algorithms.

When a communication control channel is found and the base station controller accepts the network element, connection establishment continues controlled by the base station controller. The base station allocates a necessary number of time slots from the free-time-slot group indicated by the communication control channel for communication of the network element and the base station controller and transmits information about this to the network element. The time slots are marked as allocated at both ends of the connection and also at cross-connection equipment possibly located on the transmission path.

The connections between the network elements and the base station controller being thus established in step 508 of FIG. 5, the process proceeds to step 510, wherein the network element is configured. The configuration is continued controlled by the base station controller. If necessary, the base station controller downloads software into the network element. The base station controller also downloads necessary radio network parameters into the network element. Next, the base station controller tests the operation of the network element hardware and the allocated time slots.

In step 512, the network element configuration is documented. If the network element passes the tests conducted by the base station controller, the element installer is notified of this. The installer should also be notified of the event of error. The base station controller informs the network management system of the new network element and the time slots allocated thereto. The network element is now ready to be used.

In an embodiment of the method of the invention, precautions against the event of error can be taken by first connecting the capacity required by the base station as a temporary cross-connection, and after having secured by testing that the connection works, the cross-connections are changed into permanent ones.

It is to be noted here that the procedure described above is only one example of the method of the invention. The order in which some of the above-described functions can be performed may vary.

Figure 9:
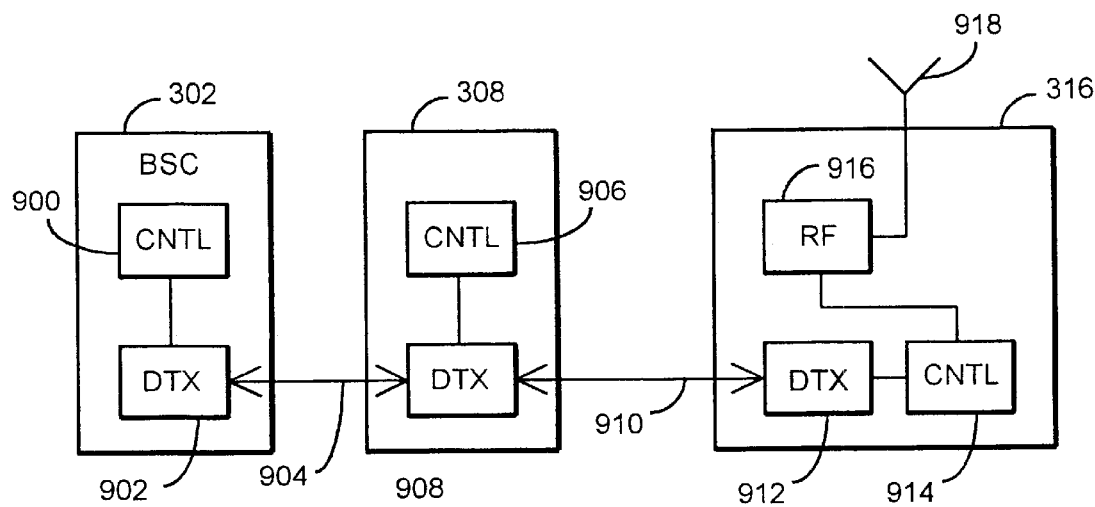
FIG. 9 illustrates an example of the structure of the radio system's base station controller, cross-connection equipment and base station.

Examples of the structure of the base station controller, cross-connection equipment and base station of the radio system in accordance with the invention are for the relevant parts illustrated in FIG. 9. The base station controller 302 comprises a control unit. The base station controller further comprises transmission equipment 902 by means of which it is connected 904 to the cross-connection equipment 308. The cross-connection equipment 308 typically comprises a control unit 906 and transmission equipment 908 by means of which it is connected 910 to the base station 316. The base station 316 typically comprises transmission equipment 912, a control unit 914, radio frequency parts 916 by means of which a desired signal is transmitted to mobile telephones via an antenna 918. The control units 900, 906 and 914 are typically implemented by means of general processors, signal processors or memory elements.

Procedures required by the method of the invention in the base stations and the base station controller can preferably be performed by software by means of commands stored in control processors. The base station controllers, cross-connection equipment and base stations of the radio system naturally also comprise other components than the ones shown in FIG. 9, as is obvious to those skilled in the art, but being irrelevant to the invention they are not shown in FIG. 9.

Figure 10A:
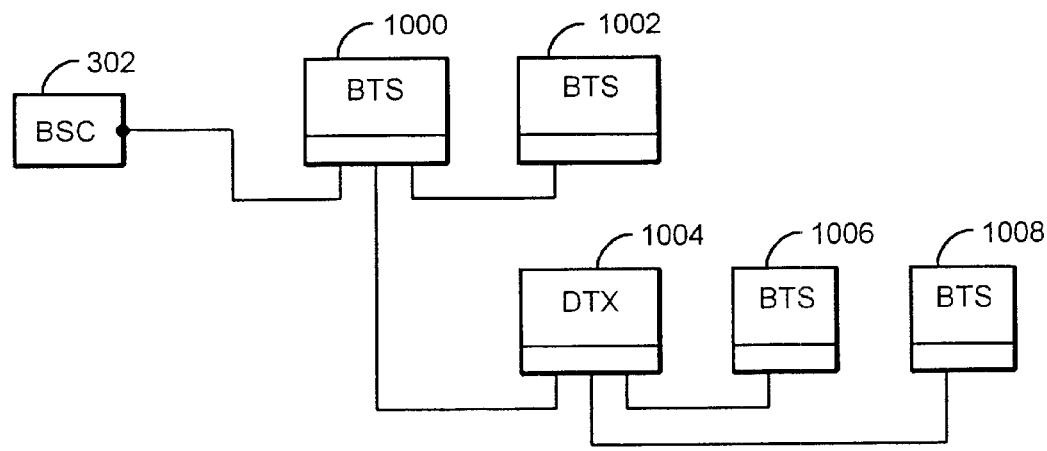
FIGS. 10a and 10b illustrate examples of transmission topologies.
Figure 10B:
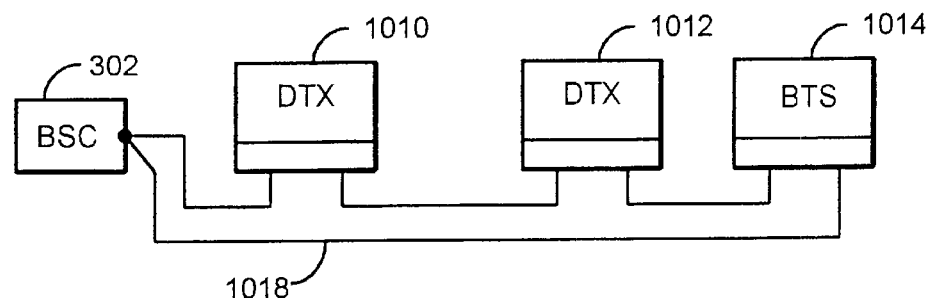

Furthermore, the solution of the invention is not restricted to the transmission topologies shown in FIG. 3, as is obvious to those skilled in the art. FIGS. 10a and 10b illustrate further examples of transmission topologies. In FIG. 10a, the system comprises the base station controller 302 connected to a base station 1000, connected, in turn, to a base station 1002 and cross-connection equipment 1004. The cross-connection equipment 1004 is connected to base stations 1006 and 1008.

In FIG. 10b, the system comprises the base station controller 302 connected to cross-connection equipment 1010. The cross-connection equipment 1010 is connected to second cross-connection equipment 1012, and the second cross-connection equipment 1010 is connected to a base station 1014. The figure also illustrates a loop connection 1018 which enables the maintenance of the connection between the network elements and the base station controller to be secured.

Although the invention has been described above with reference to the examples in accordance with the accompanying drawings, it is obvious that the invention is not restricted thereto but it can be modified in many ways within the scope of the inventive idea disclosed in the attached claims.

What is claimed is:

1. A method of establishing a connection in a radio system comprising as network elements one or more base stations (316, 324, 326, 328, 334, 336), a base station controller (302) and a network management system (300) that are operatively interconnected by means of telecommunication connections comprising traffic channels and control channels, and in which system information between the network elements is transmitted in frames that are divided into time slots, and in which system the base station controller (302) controls one or more base stations, and network element identification information has been fed into a network element to be installed, and in which method the network element is physically connected to the system by means of the telecommunication connections, characterized by predetermining identification information on base stations allowed to be connected to the base station controller for the base station controller, and the base station controller transmitting a communication channel at least in some of the frames the base station controller uses for communication with the network elements if the base station controller detects that it has been provided with identification information on base stations not yet connected to the base station controller, and after being physically installed, the network element to be installed searching the frames received by means of the telecommunication connections for communication control channels, and establishing a connection to the base station controller by means of the communication channels found.

2. A method as claimed in claim 1, characterized by in frames used by the base station controller for communicating with the network elements, unused consecutive time slots of the frames being divided into one or more groups (406, 412), and each group having one time slot (408, 414) used as a communication control channel.

3. A method as claimed in claim 2, characterized by LAPD link protocol being used on the telecommunication connections between the base station controller and the base stations, and the base station controller continually transmitting a link protocol link establishment request message over the communication control channel.

4. A method as claimed in claim 2, characterized by the base station to be connected receiving the link protocol link establishment request message transmitted by the base station controller, and the base station monitoring for a predetermined period of time whether any other base station replies to the same establishment request message, and if no other base station replies to the message, the base station transmitting an acknowledgement message to the base station controller.

5. A method as claimed in claim 2, characterized by the base station to be connected receiving the link protocol link establishment request message transmitted by the base station controller, and the base station monitoring for a predetermined period of time whether any other base station replies to the same establishment request message, and if another base station replies to the message, the base station searching for another establishment request message.

6. A method as claimed in claim 2, characterized by the base station to be installed transmitting its identification information and hardware information by means of the information received from the communication control channel to the base station controller comparing the identification information with the identification information on the allowed network elements, and when the identification information is allowed, accepting the network element, and the base station controller allocating necessary time slots for the use of communication between the network element and the base station controller from one or more groups and informing the network element of the allocated time slots over the communication control channel.

7. A method as claimed in claim 2, characterized by some of the network elements (324, 326) of the radio system being interconnected coupled in series by means of the telecommunication connections.

8. A method as claimed in claim 7, characterized by the unused-time-slot groups being transmitted by software as whole groups in the frames to network elements connected to the base station controllers by telecommunication connections capable of the transmission.

9. A method as claimed in claim 7, characterized by information on the unused-time-slot groups being manually set at network elements connected to the base station controllers by telecommunication connections incapable of transmission by software.

10. A method as claimed in claim 2, characterized by the base station to be installed, after searching the frames received by means of the telecommunication connections for communication control channels of the groups, searching the telecommunication connections for routes to the network elements having unused-time-slot groups as whole groups in the frames.

11. A method as claimed in claim 2, characterized by the communication control channel of each group being the last time slot of the group.

12. A radio system comprising one or more network elements (316, 324, 326, 328, 334, 336), a base station controller (302) and a network management system (300) that are operatively interconnected by means of telecommunication connections comprising traffic channels and control channels, and in which system information between the network elements is transmitted in frames that are divided into time slots, and in which system the base station controller controls one or more network elements that comprise network element identification information, characterized by the base station controller being arranged to update the identification information on base stations allowed to be connected to the base station, and the base station controller being arranged to detect that that it has been provided with identification information on base stations not yet connected to the base station controller, and the base station controller being arranged to transmit a communication channel at least in some of the frames the base station controller uses for communication with the network elements, and after being physically installed, the network element to be installed being arranged to search the frames received by means of the telecommunication connections for communication control channels, and to establish a connection to the base station controller by means of the communication channels found.

13. A system as claimed in claim 12, characterized by the base station controller and the base stations to be connected to the to the base station controllers being arranged to use LAPD link protocol on the telecommunication connections therebetween, and the base station controller being arranged to continually transmit a link protocol link establishment request message over the communication channel.

14. A system as claimed in claim 13, characterized by the base station to be connected being arranged to receive the link protocol link establishment request message transmitted by the base station controller, and the base station being arranged to monitor for a predetermined period of time whether any other base station replies to the same establishment request message, and if no other base station replies to the message, the base station is arranged to transmit an acknowledgement message to the base station controller.

15. A system as claimed in claim 13, characterized by the base station to be connected being arranged to receive the link protocol link establishment request message transmitted by the base station controller, and the base station being arranged to monitor for a predetermined period of time whether any other base station replies to the same establishment request message, and if another base station replies to the message, the base station being arranged to search for another establishment request message.

16. A system as claimed in claim 12, characterized by the base station to be installed being arranged to transmit its identification information and hardware information by means of the information received from the communication control channel to the base station controller, and the base station controller being arranged to compare the identification information with the identification information on the allowed network elements, and when the identification information is allowed, to accept the network element, and the base station controller being arranged to allocate necessary time slots for the use of communication between the network element and the base station controller from one or more groups and to inform the network element of the allocated time slots over the communication control channel.

17. A system as claimed in claim 12, characterized by certain capacity being allocated from the telecommunication connection between the network elements of the system for communication between the network elements.

18. A system as claimed in claim 17, characterized by the allocated capacity comprising a given number of some free time slots.

* * * * *

UNITED STATES PATENT AND TRADEMARK OFFICE
CERTIFICATE OF CORRECTION

PATENT NO. : 6,574,208 B1
DATED : June 3, 2003
INVENTOR(S) : Matturi et al.

It is certified that error appears in the above-identified patent and that said Letters Patent is hereby corrected as shown below:

<u>Title page,</u>
Please add the following items:
-- [86]  PCT No.:        PCT/FI99/00353
         § 371 (c)(1)
         (2)(4) Date:    April 28, 1999

[87]  PCT Pub. No.:   WO 99/56486
         PCT Pub. Date:  Nov. 4, 1999 --

Signed and Sealed this

Twenty-third Day of December, 2003

JAMES E. ROGAN
*Director of the United States Patent and Trademark Office*